United States Patent [19]

Hirayama et al.

[11] Patent Number: 5,012,364

[45] Date of Patent: Apr. 30, 1991

[54] TAPE-LOADING MECHANISM FOR A MAGNETIC RECORDING/REPRODUCING APPARATUS FOR SELECTIVE USE OF TAPE CASSETTES OF TWO DIFFERENT SIZES

[75] Inventors: Hiromichi Hirayama, Yokohama; Masato Mihara, Hiratsuka; Mitsuo Harumatsu, Ota, all of Japan

[73] Assignee: Victor Company of Japan, Ltd., Yokohama, Japan

[21] Appl. No.: 397,686

[22] Filed: Aug. 23, 1989

[30] Foreign Application Priority Data

Aug. 23, 1988 [JP] Japan .................. 63-208781

[51] Int. Cl.$^5$ .................. G11B 5/008; G11B 5/027
[52] U.S. Cl. .................. 360/94; 360/85
[58] Field of Search .................. 360/85, 94, 95

[56] References Cited

U.S. PATENT DOCUMENTS

| 3,594,008 | 7/1971 | Takagi | 274/4 |
| 4,005,487 | 1/1977 | Asai et al. | 360/94 |
| 4,580,183 | 4/1986 | Maeda et al. | 360/94 |
| 4,853,805 | 8/1989 | Baranski | 360/94 |
| 4,866,550 | 9/1989 | Ohashi et al. | 360/94 |
| 4,899,235 | 2/1990 | Kano et al. | 360/85 |

FOREIGN PATENT DOCUMENTS

| 2843336 | 4/1979 | Fed. Rep. of Germany . |
| 3700889 | 7/1987 | Fed. Rep. of Germany . |
| 2015021 | 4/1970 | France . |
| 2194666 | 3/1988 | United Kingdom . |

OTHER PUBLICATIONS

Patent Abstract, vol. 8, No. 65 (P-263) [1502] Mar. 84, Tape Cassette Adaptor, Appl. No. 57-92967.

*Primary Examiner*—A. J. Heinz
*Assistant Examiner*—Jefferson Evans
*Attorney, Agent, or Firm*—Fleit, Jacobson, Cohn, Price, Holman & Stern

[57] ABSTRACT

A mechanism for loading the tape of a standard- or compact-size tape cassette against a rotary head assembly in a compatible recording/reproducing apparatus for selective use with the two types of tape cassettes. The apparatus has a main chassis with a set of fixed positioning pins for positioning the standard-size tape cassette thereon. A floating chassis, much less in size than the main chassis, is mounted thereto for displacement in a direction normal to the principal plane of the main chassis. A pair of tape loader assemblies are mounted to the main chassis for taking the tape out from the standard-size tape cassette positioned on the main chassis, or from the compact-size tape cassette positioned on the floating chassis, and for loading the tape against the rotary head assembly. A common drive cam is coupled to both the floating chassis and the tape loader assemblies via separate drive linkages in order to cause their timed travels. The drive linkage from the drive cam to the tape loader assemblies can be constructed in far less space than its conventional counterpart.

5 Claims, 10 Drawing Sheets

TAPE-LOADING MECHANISM FOR A MAGNETIC RECORDING/REPRODUCING APPARATUS FOR SELECTIVE USE OF TAPE CASSETTES OF TWO DIFFERENT SIZES

BACKGROUND OF THE INVENTION

This invention relates generally to an apparatus for recording and/or reproducing data on record media, and particularly to such an apparatus for use with magnetic tape packaged in cassette form. More particularly, the invention pertains to a compatible recording/reproducing apparatus that can be put to selective use with standard-size tape cassettes and with those of smaller size. Still more particularly, the invention deals with a tape-loading mechanism in such an apparatus for taking the tape out of the loaded tape cassette of either size and holding the tape against the rotary magnetic head assembly for recording or reproduction.

In video tape recorders or decks, as is well known, the tape-loading mechanism is provided which comprises a pair of tape loader assemblies movable along guideways on the opposite sides of the rotary magnetic head assembly. As the tape cassette is mounted in position within the apparatus, the tape loader assemblies enter the usual recesses in one edge of the cassette housing for engaging the tape. Then, traveling back along the guideways, the tape loader assembling pull the tape out of the cassette and hold the tape against the rotary head assembly for magnetic recording or reproduction.

Although the tape-loading mechanism, particularly the pair of movable tape loader assemblies, is well designed to perform the functions for which it is intended, some problems have arisen when it is adapted for use in the compatible recording/reproducing apparatus of the type under consideration.

Video tape cassettes are commercially available today in two different sizes, that is, standard size and compact size. Standard-size tape cassettes find widespread use with video tape recorders or decks of standard design. Compact-size cassettes have more recently been developed for use with portable video cameras. The majority of prior art tape decks have been designed for use with standard-size cassettes only. The standard-size cassettes are standardized not only in the size of the cassette housing but also in the shape and size of the recesses for receiving the tape loader assemblies, tape tension pole, etc., as well as in the shape and size of the tape reels and in the center-to-center distance therebetween.

Adapters have therefore been required for using the compact-size cassettes on such tape decks. The compact-size cassette has had to be first loaded in the adapter, and the loaded adapter has then been inserted in the deck.

In order to eliminate the trouble with use of cassette adapters, Japanese Patent Applications Nos. 62-282248 and 62-331188 suggest a compatible recording/reproducing apparatus. Both standard-size and compact-size tape cassettes can be loaded interchangeably in the apparatus without use of adapters.

As incorporated in this prior art apparatus, the tape-loading mechanism comprises a stack of three ring gears disposed under the main chassis for driving the pair of tape loader assemblies back and forth along the guideways. The tape loader assemblies have two different sets of tape-unloading positions, one for the standard-size tape cassette and the other for the compact-size tape cassette. When the tape cassette of either size is inserted in the apparatus, the tape loader assemblies engage the tape of the loaded cassette in the corresponding one of the two tape-unloading positions. Then the tape loader assemblies travel back along the guideways, pulling out the tape in so doing, to a preassigned tape-loading position for loading the tape against the rotary magnetic head assembly.

The prior art apparatus comprises a floating chassis on which the compact-size tape cassette is to be positioned, in addition to the fixed main chassis on which the standard-size tape cassette is to be mounted. The floating chassis is movable up and down through an aperture in the main chassis. Held descended to a retracted position when the standard-size tape cassette is mounted on the main chassis, the floating chassis ascends to a working position when the compact-size tape cassette is inserted in the apparatus.

The stack of ring gears included in the conventional tape-loading mechanism has proved unsatisfactory by reasons of the large space required and its location under the main chassis. Limitations have thus been imposed on the reduction of the size of the apparatus, particularly of its height or thickness.

It has been envisaged within the scope of the noted prior art apparatus to employ linkage systems in lieu of the ring gears, for moving the tape loader assemblies along the guideways. The linkage systems offers the advantage over the stack of ring gears, of physically less space required for installation. However, the linkage systems as conventionally proposed has had a problem left unsolved in connection with the up-and-down movement of the floating chassis.

The linkage systems must of necessity partly underlie the floating chassis when the tape loader assemblies are in the unloading position for the compact-size tape cassette. The vertical dimension of the apparatus would increase too much if the linkage systems were disposed below the lower retracted position of the floating chassis. An obvious solution to this problem is to position the linkage systems within the vertical stroke of the floating chassis. In that case, however, the movement of the linkage systems must be well timed with that of the floating chassis in order to avoid the following difficulties:

Suppose that the floating chassis is descended to the retracted position. Then, should the linkage systems be actuated to move the tape loader assemblies to the unloading position for the compact-size tape cassette, the linkage systems would interfere with the floating chassis. Also, the floating chassis would come into collision with the linkage systems if it descended when the tape loader assemblies were in the unloading position for the compact-size tape cassette.

SUMMARY OF THE INVENTION

The present invention makes it possible, in a compatible magnetic recording/reproducing apparatus of the type defined, to drive the pair of tape loader assemblies by means that are so compact, and are so positioned and so operationally interrelated with other parts of the apparatus, as to contribute to reducing the size of the apparatus to a minimum.

Briefly summarized, the invention provides, in a compatible recording/reproducing apparatus for selective use with a relatively large-size (e.g. standard-size) tape cassette and a relatively small-size (e.g. compact-size)

tape cassette, the combination comprising a main chassis having a first positioning means for positioning the large-size tape cassette thereon. A floating chassis, having second positioning means for positioning the small-size tape cassette thereon, is mounted to the main chassis for displacement in a direction (e.g. vertical) normal to the principal plane (e.g. horizontal) of the main chassis. Also mounted to the main chassis is tape loader means for pulling out a tape from the large-size tape cassette positioned on the first positioning means, or from the small-size tape cassette positioned on the second positioning means, and for loading the tape against a rotary head assembly on the main chassis.

A common drive means, typically comprising a drive cam, is coupled to the floating chassis via a floating chassis drive linkage and to the tape loader means via a tape loader drive linkage. The drive means moves the floating chassis relative to the main chassis between a working position, where the floating chassis has the small-size tape cassette positioned on the second positioning means thereon, and a retracted position where the floating chassis is out of interference with the large-size tape cassette positioned on the first positioning means on the main chassis. The floating chassis is normally held in the working position. Also, the drive means moves, via the tape loader drive linkage, the tape loader means among a first tape-unloading position where the tape loader means engages the tape of the large-size tape cassette positioned on the first positioning means, a second tape-unloading position where the tape loader means engages the tape of the small-size tape cassette positioned on the second positioning means, and a tape-loading position where the tape loader means loads the tape that has been taken out from the large- or small-size tape cassette and positions it against the rotary head assembly. The tape loader drive linkage is at least partly in the path of the movement of the floating chassis between the working and the retracted positions only when holding the tape loader means in the second tape-unloading position.

Normally, the floating chassis is held in the working position so as to readily permit the small-size tape cassette to be positioned thereon. The tape loader means is normally held in the second tape-unloading position, ready to engage the tape of the small-size tape cassette as the latter is positioned on the floating chassis.

The drive means can controllably drive the floating chassis and the tape loader means in timed relationship to each other. When the large-size tape cassette is inserted in the apparatus, the drive means operates to move the floating chassis from the working to the retracted position after moving the tape loader means from the second back to the first tape-unloading position. Also, when the large-size tape cassette is withdrawn from the apparatus, the drive means operates to move the floating chassis from the retracted to the working position before moving the tape loader means back to the second tape-unloading position.

The tape loader drive linkage can be of much less vertical dimension than the conventional stack of ring gears. Moreover, when the tape loader means is in the second tape-unloading position, with the floating chassis in the working position, the tape loader drive linkage partly underlies the floating chassis with a view to a minimal installation space in a horizontal direction. A very substantial saving is thus realized in the space for the installation of the tape loader drive means, both vertically and horizontally, making it possible to correspondingly reduce the dimensions of the entire apparatus.

It will also be appreciated that the invention is well designed to avoid collision of the floating chassis and the tape loader drive linkage despite the arrangement of the drive linkage partly in the path of travel of the floating chassis between the working and retracted positions. Although the floating chassis and the tape loader means are both initialized in the positions for accepting the small-size tape cassette, they are automatically displaced to the alternative positions when the large-size tape cassette is inserted in the apparatus.

The above and other features and advantages of this invention and the manner of realizing them will become more apparent, and the invention itself will best be understood, from a study of the following description and appended claims, with reference had to the attached drawings showing the preferred embodiment of the invention.

DESCRIPTION OF THE PREFERRED EMBODIMENT

Figure 1:
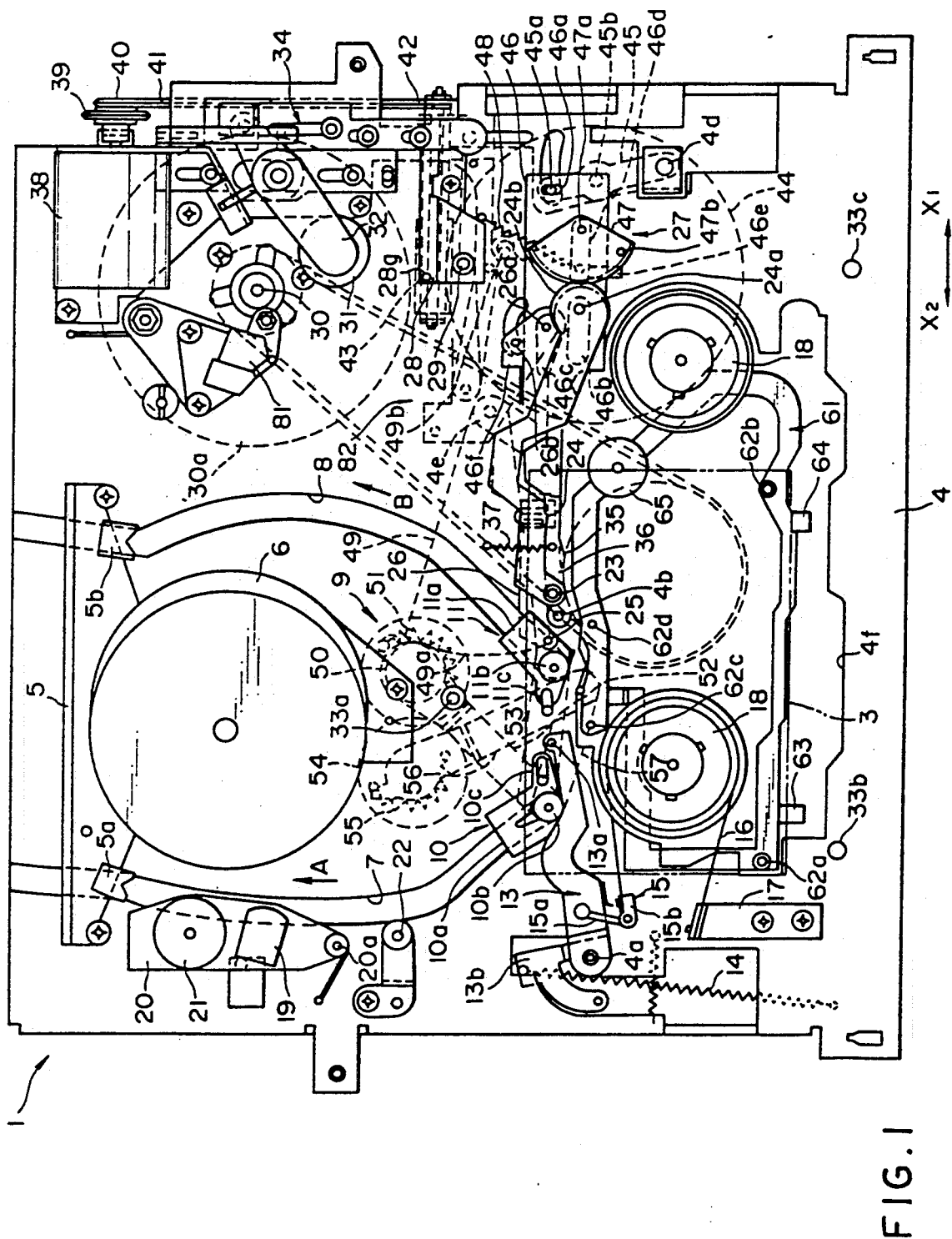
FIG. 1 is a top plan of the compatible recording/reproducing apparatus constructed in accordance with the invention, the apparatus being shown with a compact-size tape cassette loaded in position therein and with the pair of tape loader assemblies in the second tape-unloading position.
Figure 2:
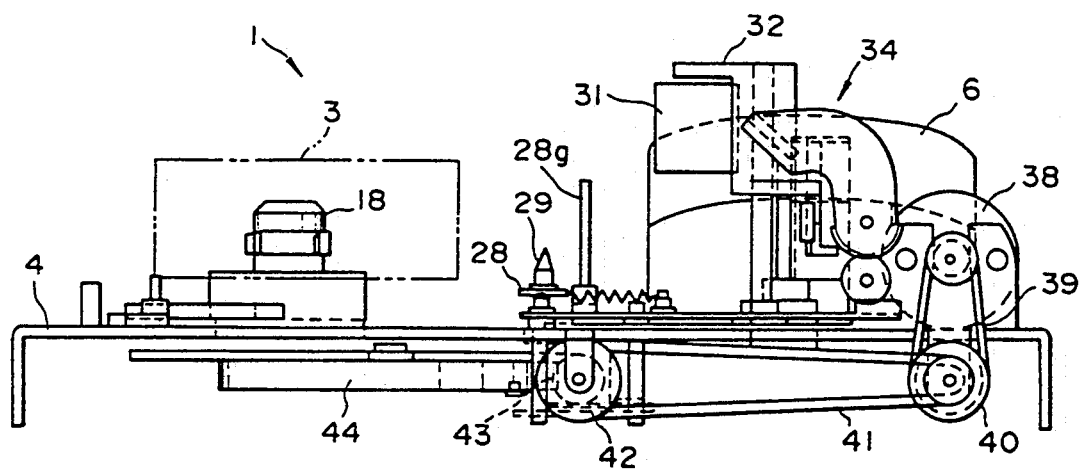
FIG. 2 is a right-hand side elevation of the apparatus of FIG. 1, showing in particular the drive cam and means for imparting rotation thereto.
Figure 3:
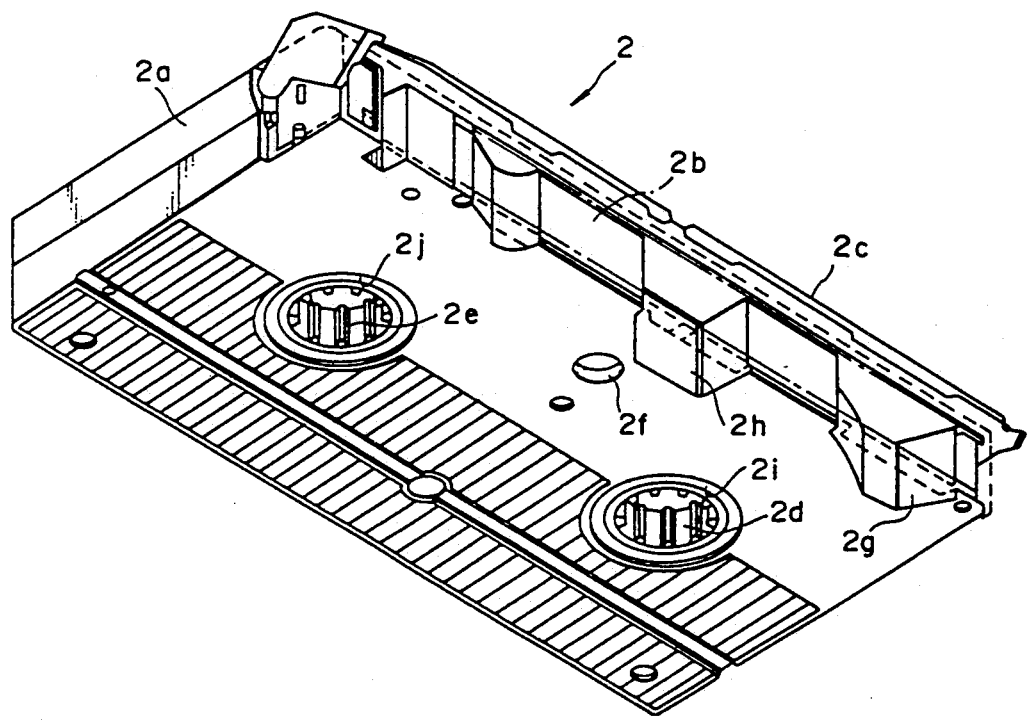
FIG. 3 is a perspective view of a standard-size tape cassette for use with the apparatus of FIG. 1.
Figure 4A:
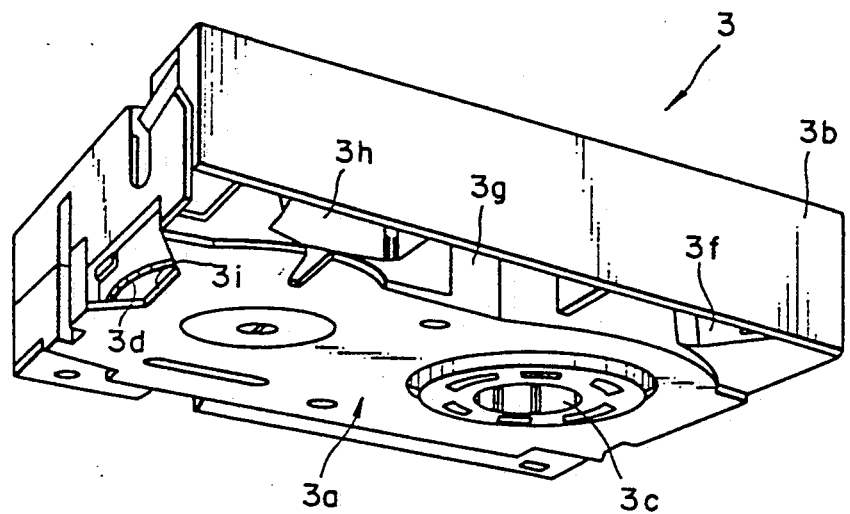
FIG. 4A is a perspective view of the compact-size tape cassette shown loaded in the apparatus of FIG. 1, the view showing the cassette as seen from its bottom side.
Figure 4B:
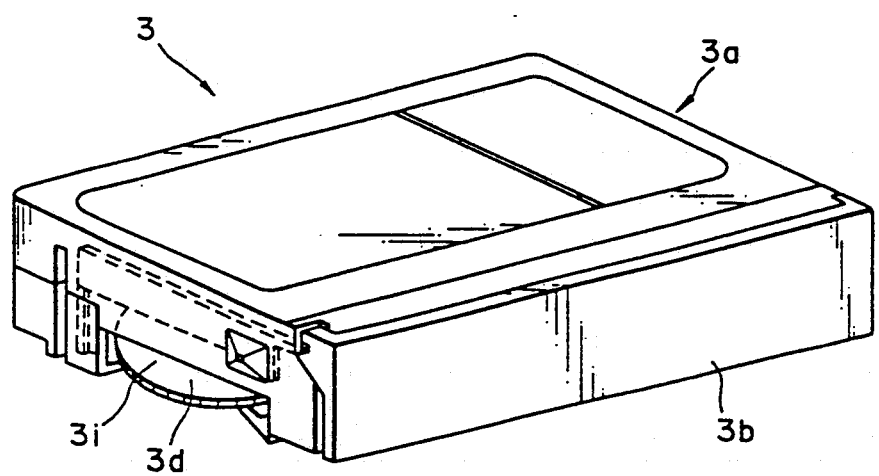
FIG. 4B is a view similar to FIG. 4A except that the compact-size tape cassette is shown as seen from its top side.

The compatible magnetic recording/reproducing apparatus 1 shown in FIGS. 1 and 2 is intended for selective use with a standard-size tape cassette 2 of FIG. 3 and a compact-size tape cassette 3 of FIGS. 4A and 4B. The two types of tape cassettes 2 and 3 may be interchangeably loaded in the apparatus 1 without use of any adapter. It will assist an easier understanding of the invention to first describe the standard- and compact-size tape cassettes 2 and 3 and then to proceed to the description of the apparatus 1.

With reference therefore to FIG. 3, the standard-size tape cassette 2 illustrated in perspective therein has a housing 2a of generally flat, boxlike shape. The cassette housing 2a has a hinged cover 2c at its front end by way of protection of a front tape path 2b. Behind this tape path 2b the cassette housing 2a has recesses 2g and 2h formed in its front end. The bottom of the cassette housing 2a has two holes 2i and 2j to expose a supply reel hub 2d and a takeup reel hub 2e which are both rotatably mounted within the housing for reel-to-reel tape transportation. An additional hole 2f of smaller diameter, formed approximately centrally in the bottom of the cassette housing 2a, is intended for the insertion of a light source (seen at 35 in FIG. 1) for tape end detection.

The compact-size tape cassette 3 of FIGS. 4A and 4B, on the other hand, also has a housing 3a of generally flat, boxlike shape but smaller in size than the housing 2a of the standard-size tape cassette 2. The cassette housing 3a has a hinged cover 3b at its front end in which there are defined three recesses 3f, 3g and 3h. A hole 3c is formed in the bottom of the cassette housing 3a to expose a supply reel hub, not shown, which is rotatably mounted therein. An aperture 3i is formed in the bottom and one side edge of the cassette housing 3a to expose a gear 3d formed in one piece with the takeup reel, not shown, which also is rotatably mounted within the cassette housing. The takeup reel of the compact-size tape cassette 3 is to be driven through the gear 3d.

Figure 5:
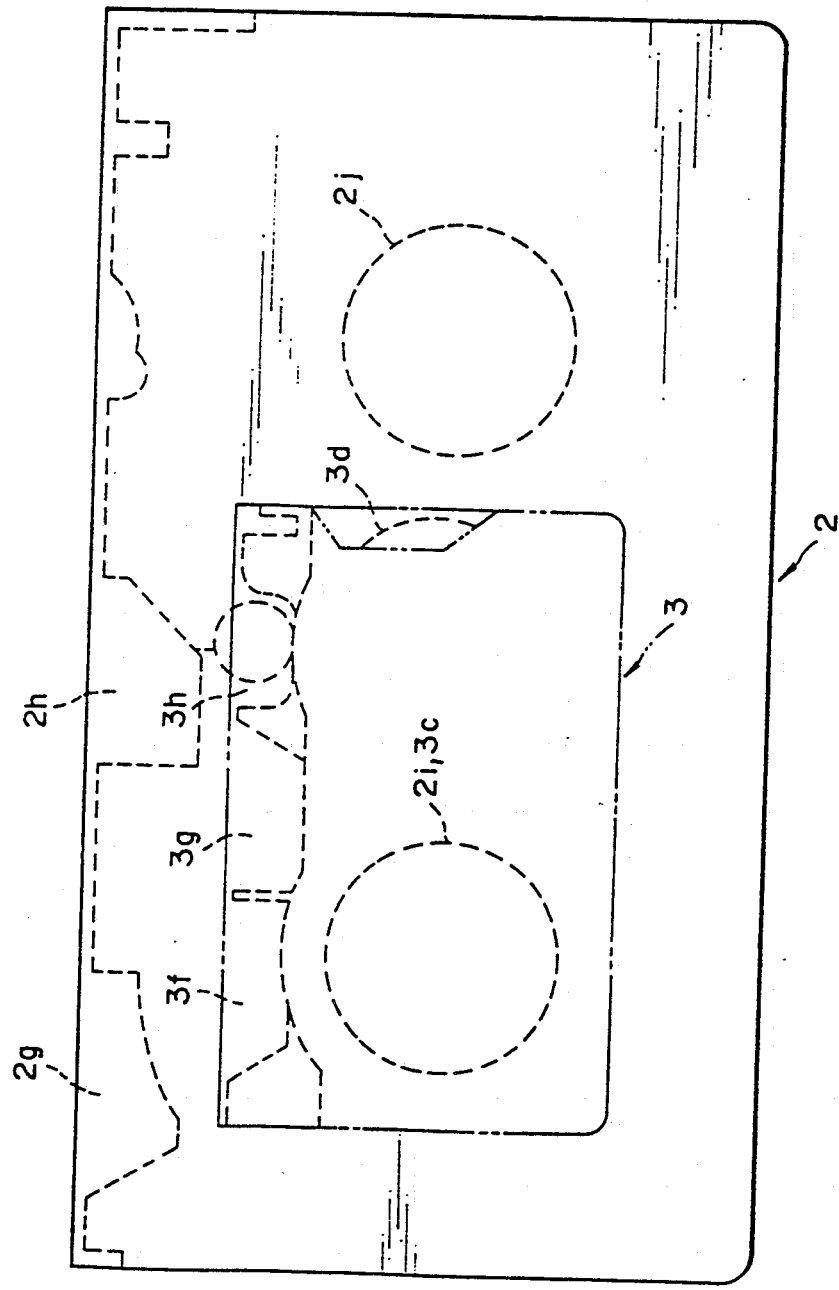
FIG. 5 is a plan view of an explanatory nature showing the standard- and compact-size tape cassettes in correct dimensional relationship.

In FIG. 5 are shown both the standard-size tape cassette 2 and the compact-size tape cassette 3 in the correct dimensional relationship. A very substantial difference will be observed between their sizes as well as between their reel-to-reel distances. A difference also exists between the driving methods of their takeup reels. The compatible recording/reproducing apparatus 1 of FIGS. 1 and 2 is well adapted for handling both types of tape cassettes 2 and 3.

FIG. 5 also shows the two tape cassettes 2 and 3 in their relative positions when loaded in the apparatus 1. The supply hub hole 2i in the standard-size tape cassette 2 is in axial alignment with the supply hub hole 3c in the compact-size tape cassette 3. It will also be noted that, with the tape cassettes 2 and 3 so positioned within the apparatus 1, a considerable difference exists between the horizontal positions of the recesses 2g and 2h in the standard-size tape cassette 2 and of the recesses 3f, 3g and 3h in the compact-size tape cassette 3.

With the foregoing constructional and dimensional differences between the two tape cassettes 2 and 3 in mind, the compatible magnetic recording/reproducing apparatus 1 for selective use therewith will now be described in detail.

As will be understood from FIG. 1, taken together with FIG. 2, the magnetic recording/reproducing apparatus 1 has a main chassis 4 of generally rectangular shape. It is understood that the apparatus 1 is to be laid in use with the main chassis 4 disposed horizontally. Therefore, hereinafter in this specification, the various directional terms will be used in reference to this horizontal positioning of the main chassis 4. Mounted on the main chassis 4 are, first of all, a pair of upstanding drive spindles 18 for driving engagement with the reel hubs of the standard-size tape cassette 2 as the latter is loaded in a preassigned position within the apparatus 1. The preassigned loading position of the standard-size tape cassette is indicated by its dotted outline in FIG. 8. The left-hand drive spindle 18, as seen in FIG. 1, is also intended for driving engagement with one of the reel hubs of the compact-size tape cassette 3 indicated by the phantom outline in this figure.

The main chassis 4 has also erected thereon four positioning pins 29, 33a, 33b and 33c which determine the height or vertical position of the standard-size tape cassette 2. As better shown in FIG. 2, the takeup-side positioning pin 29 is mounted on an arm rest or support 28 to be referred to subsequently. The supply-side positioning pin 33a is formed directly on the main chassis 4 immediately in front of the rotary head assembly 6. The other two positioning pins 33b and 33c are also mounted directly on the main chassis 4.

Also mounted on the main chassis 4 via a fixed base 5 is a rotary magnetic head assembly 6 disposed rearwardly, or upwardly as viewed in FIG. 1, of the loading positions of the standard- and compact-size tape cassette 2 and 3. A pair of elongate slots 7 and 8 are formed arcuately in the main chassis 4 on the opposite sides of the rotary head assembly 6. These arcuate slots 7 and 8 serve as guideways for a pair of tape loader assemblies 10 and 11 constituting parts of the tape-loading mechanism in accordance with the invention. The tape loader assemblies 10 and 11 are slidably engaged one in each of the guideways 7 and 8. The present invention is specifically directed to a means for driving the pair of tape loader assemblies 10 and 11 back and forth along the respective guideways 7 and 8.

As the standard- or compact-size tape cassette 2 or 3 is loaded in the apparatus 1, the tape loader assemblies 10 and 11 are to travel along the guideways 7 and 8 for taking out the magnetic tape from the loaded tape cassette and wrapping the tape around a predetermined angle of the rotary head assembly 6 for recording or reproduction. Since the tape must be taken out not only from the standard-size tape cassette 2 but also from the compact-size tape cassette 3, the guideways 7 and 8 extend further forwardly, downwardly as viewed in FIG. 1, of the rotary head assembly 6 than in the known apparatus designed for use with standard-size tape cassettes only.

Each tape loader assembly 10 or 11 comprises a carriage 10a or 11a slidably engaged in the guideway 7 or 8, a guide roller 10b or 11b erected on the carriage, and a slanting pole 10c or 11c formed on the carriage.

The tape loader assemblies 10 and 11 are normally held in the second tape-unloading position of FIG. 1, to readily permit the compact-size tape cassette 3 to be positioned thereon. When the standard-size tape cassette 2 is inserted in the apparatus, the tape loader assemblies 10 and 11 automatically travel to the first tape-unloading positions of FIG. 8. When in the first tape-unloading positions of FIG. 8, the tape loader assemblies 10 and 11 have their guide rollers 10b and 11b and slanting poles 10c and 11c received in the recesses 2g and 2h, FIG. 3, in the standard-size tape cassette 2. When in the second tape-unloading positions of FIG. 1, on the other hand, the tape loader assemblies 10 and 11 have their guide rollers 10b and 11b and slanting poles 10c and 11c received in the aforesaid recesses 3f and 3g, FIG. 4A, in the compact-size tape cassette 3.

The fixed base 5 for the rotary head assembly 6 has a pair of V-shaped stops 5a and 5b overhanging the guideways 7 and 8. Traveling along the guideways in the direction of the arrows A and B from the tape-unloading positions of either FIGS. 1 or 8, the tape loader assemblies 10 and 11 come into abutment against the stops 5a and 5b. The tape loader assemblies 10 and 11 are then in the tape-loading positions, in which they load the magnetic tape against the rotary head assembly 6.

As indicated by the broken lines in FIG. 1, a drive cam 44 is rotatably mounted under the main chassis 4 for driving the tape loader assemblies 10 and 11 between the tape-unloading and tape-loading positions. The drive cam 44 is coupled to the tape loader assemblies 10 and 11 via a tape loader drive linkage 9 constituting a feature of this invention. The tape loader drive linkage 9 as well as the drive cam 44 will be detailed subsequently.

Generally designated 61 in FIG. 1 is a floating chassis for the compact-size tape cassette 3. As the name implies, the floating chassis 61 is movable up and down between a working and a retracted position through an aperture 4f formed in the main chassis 4.

Figure 6:
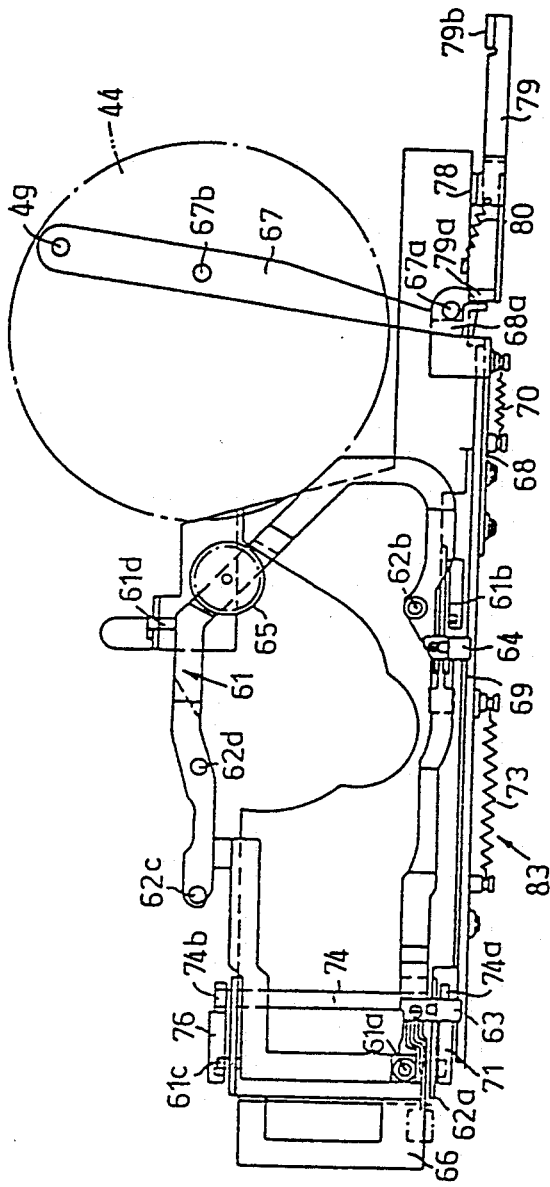
FIG. 6 is a top plan of the floating chassis, the floating chassis drive linkage, and the floating-chassis-locking means in the apparatus of FIG. 1, the view showing the floating chassis in the working position.
Figure 7:
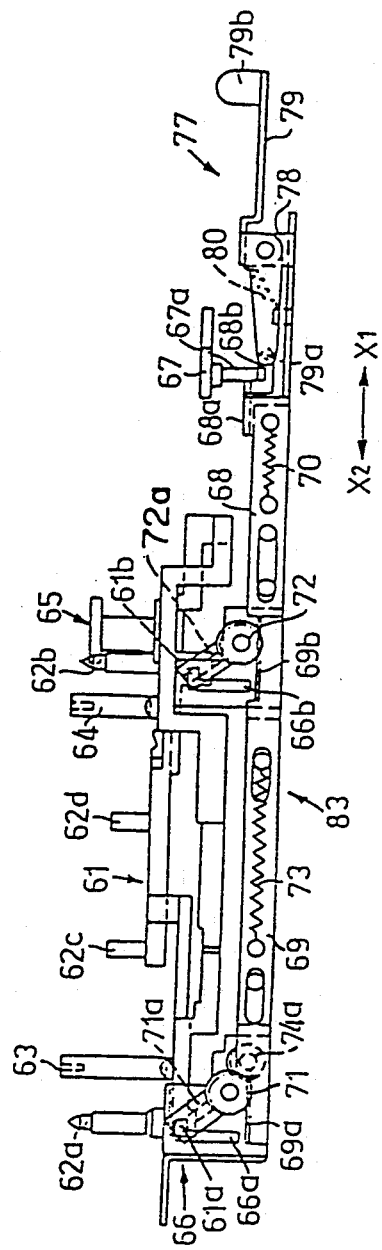
FIG. 7 is a front elevation of the showing of FIG. 6.

As better illustrated in FIGS. 6 and 7, the floating chassis 61 takes the form of a generally rectangular frame. The floating chassis 61 has mounted thereon a set of positioning pins 62a, 62b, 62c and 62d, an anti-erase sensor 63, a tape type sensor 64, and a reel drive gear 65, all in fixed positions that are predetermined with respect to one another and to the compact-size tape cassette 3. The positioning pins 62a-62d function to determine the vertical position of the compact-size tape cassette 3 within the apparatus 1. The anti-erase sensor 63 serves to sense the presence or absence of the anti-erase tab, not seen, on the loaded compact-size tape cassette 3. The tape type sensor 64 serves to sense the presence or absence of a tape type hole which indicates a particular type of magnetic property of the tape housed in the cassette, also not seen, in the housing of the compact-size tape cassette 3. The reel drive gear 65 is for driving engagement with the gear 3d, FIGS. 4A and 4B, of the compact-size tape cassette 3 when the floating chassis 61 is raised to its working position.

Figure 14:
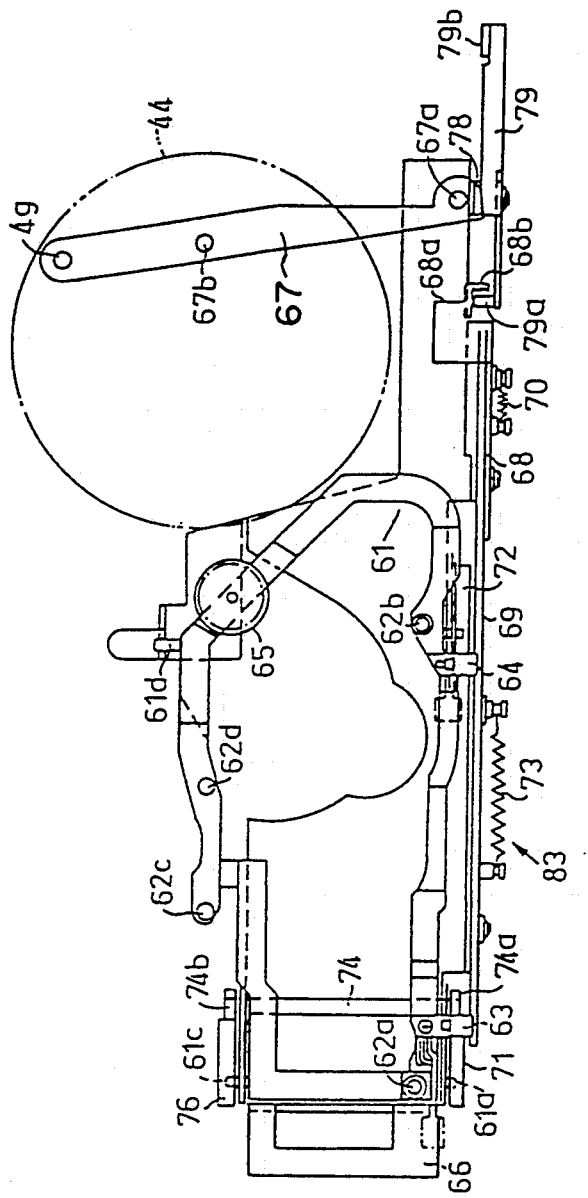
FIG. 14 is a view similar to FIG. 6 except that the floating chassis is shown in the retracted position.

The floating chassis 61 together with the various parts mounted thereon is moved up and down relative to the main chassis 4 between a working position of FIG. 7 and a retracted position of FIG. 14. As may be seen from FIG. 6, it is also the drive cam 44 that drives the floating chassis 61 between the two required positions. The drive cam 44 is coupled to the floating chassis 61 via a floating-chassis drive linkage 83, which is to be presently referred to in greater detail.

With reference back to FIG. 1 a tension arm 13 is proximally pinned at 4a on the main chassis 4 for pivotal motion in a horizontal plane. Erected on the distal end of the tension arm 13 is a tension pole 13a which is to enter the recess 2g in the standard-size tape cassette 2 and the recess 3f in the compact-size tape cassette 3. A helical tension spring 14 extends between a hook on the main chassis 4 and a branch arm 13b joined to the tension arm 13, biasing the latter in a counterclockwise direction as viewed in FIG. 1. Consequently, when the supply-side tape loader assembly 10 is within its reach, the tension arm 13 butts on its carriage 10a under the bias of the tension spring 14 and swings about the pivot pin 4a with the travel of the tape loader assembly 10 along the guideway 7.

A link 15a, constituting a toggle mechanism 15 in combination with another link 15b, is a pin jointed to the tension arm 13 at its midpoint. The toggle mechanism 15 is engaged with one extremity of a brake band 16 which extends around the supply-side drive spindle 18 and which is engaged at the other extremity with an anchor 17 fastened to the main chassis 4.

A full-width erase head 19 is mounted fast on an erase head mount 20 which in turn is pinned at 20a on the main chassis 4 for pivotal motion in a horizontal plane. An impedance roller 21 is also mounted on the erase head mount 20. A tape guide roller 22 is disposed between the erase head mount 20 and the preassigned loading positions of the tape cassettes 2 and 3 which are indicated respectively in FIGS. 1 and 8.

Figure 8:
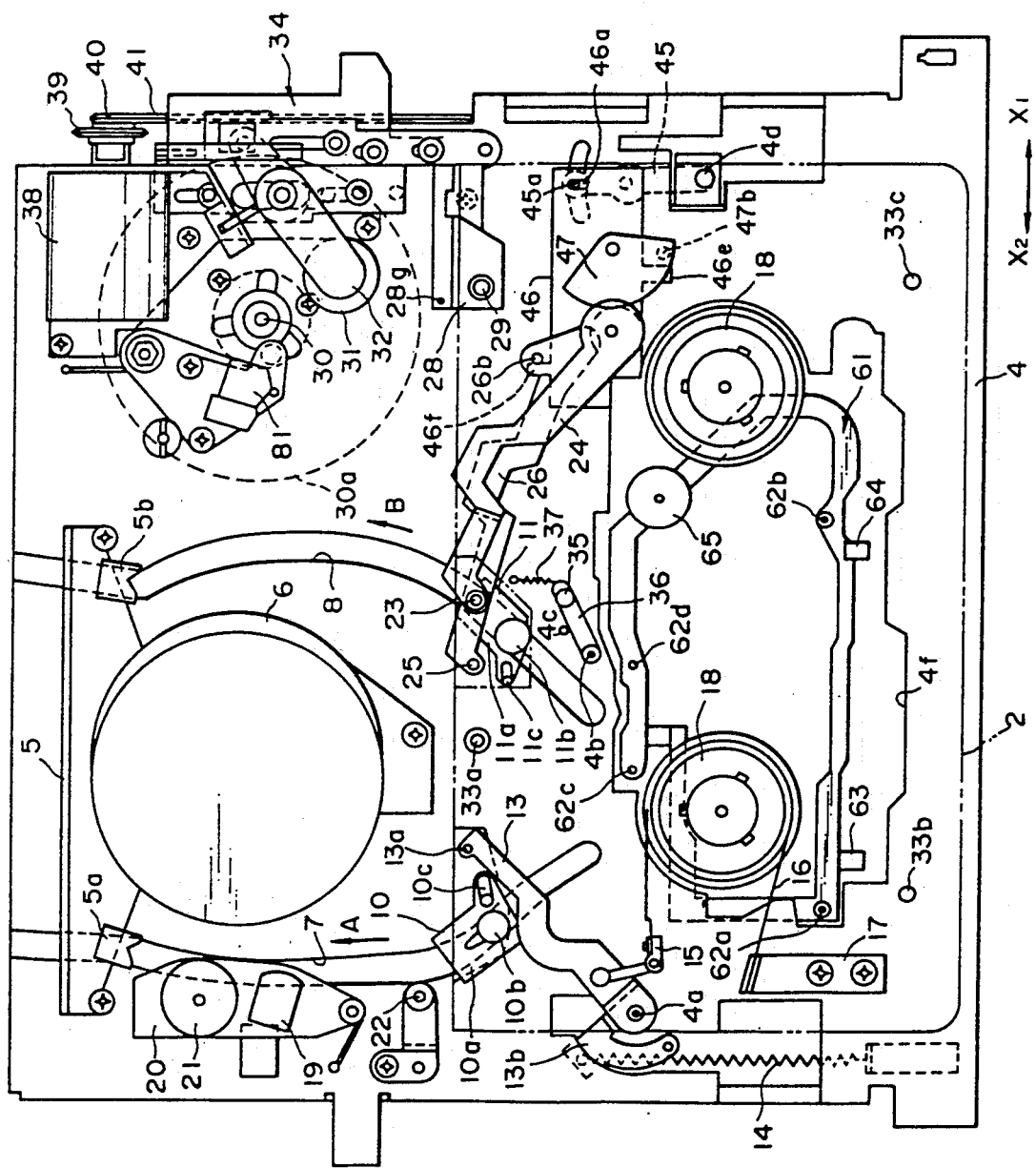
FIG. 8 is a view similar to FIG. 1 except that the apparatus is shown with the standard-size tape cassette loaded in position therein and with the pair of tape loader assemblies in the first tape-unloading position.

As will be seen from both FIGS. 1 and 8, a guide pole 23 is erected on the free end of a guide arm 24. A half-loading pole 25 is erected on the free end of a half-loading arm 26. Both guide arm 24 and half-loading arm 26 are also driven by the drive cam 44 via a pole transfer mechanism 27 yet to be described. Suffice it to say for the moment that the guide pole 23 and half-loading pole 25 take the positions of FIG. 1 for engagement in the recesses 3g and 3h, FIG. 4A, in the compact-size tape cassette 3 when the latter is loaded in the apparatus 1. When the standard-size tape cassette 2 is loaded, on the other hand, the poles 23 and 25 take the positions of FIG. 8 for engagement in the recess 2h, FIG. 3, in that cassette.

As has been mentioned, the positioning pin 29 is mounted on the arm rest 28. Approximately in the shape of a recumbent U, the arm rest 28 functions to firmly hold the guide arm 24 when the latter is fully pivoted clockwise from its FIG. 1 or 8 position. Additionally, the arm rest 28 serves the purpose of supporting the positioning pin 29 out of interference with the guide arm 24.

Both FIGS. 1 and 8 also show a capstan 30 and a pinch roller 31. The capstan 30 is coupled directly to a capstan motor 30a, disposed under the main chassis 4, for rotation about a vertical axis in a counterclockwise direction as viewed in FIGS. 1 and 8. The pinch roller 31 is rotatably mounted on the free end of a pinch roller arm 32 which is not only swingable in a horizontal plane but also movable up and down with respect to the main chassis 4. It will be seen that the capstan 30 is positioned a considerable distance away from the loading positions of the tape cassettes 2 and 3 in a direction parallel to the principal plane of the main chassis 4. The distance is such that the capstan motor 30a, although much larger in size than the capstan 30, is totally out of register with the loading positions of the tape cassettes 2 and 3. This arrangement of the capstan 30 and the capstan motor 30a also contributes to the reduction of the vertical dimension or thickness of the apparatus 1.

A light source 35 for tape end detection is mounted on the free end of a carrier arm 36 which is pinned at 4b on the main chassis 4 for pivotal movement in a horizontal plane. A helical tension spring 37 biases the pivotal carrier arm 36 in a counterclockwise direction as viewed in FIGS. 1 and 8. When the standard-size tape cassette 2 is loaded, the carrier arm 36 is sprung into abutment against a fixed pin 4c on the main chassis 4. Thus the light source 35 becomes positioned for insertion in the hole 2f, FIG. 3, in the housing 2a of the standard-size tape cassette 2.

When no tape cassette is loaded, or when the compact-size tape cassette 3 is loaded, the carrier arm 36 is pushed by the guide arm 24 against the bias of the tension spring 37 to the position of FIG. 1. The light source 35 is then positioned for engagement in the compact-size tape cassette 3.

At 81 is seen an audio control head disposed between the rotary head assembly 6 and the capstan 30. As is well known, the audio/control head 81 contacts the control track and audio track of the magnetic tape for the recording and reproduction of audio and control signals.

The foregoing has been the outline of the recording-/reproducing apparatus 1. It has been herein stated that the drive cam 44 drives the pair of tape loader assemblies 10 and 11 via the tape loader drive linkage 9, the guide arm 24 and half-loading arm 26 via the pole transfer mechanism 27, and the floating chassis 61 via the floating-chassis drive linkage 83. Thus the tape-loading mechanism of this invention is closely functionally related to the arms 24 and 26 and the floating chassis 61. It will therefore assist a better understanding of the invention to first describe how the arms 24 and 26 and the floating chassis 61 are driven from the drive cam 44, before proceeding to a detailed study of the tape-loading mechanism featuring the tape loader drive linkage 9.

The drive cam 44, seen in FIGS. 1, 2 and 6, itself takes the form of a toothed disk disposed on the underside of the main chassis 4 for rotation about a vertical axis. Employed for bidirectionally revolving the drive cam 44 is a reversible electric drive motor 38 seen in both FIGS. 1 and 2. The rotation of the drive motor 38 is first transmitted to a pulley 40 via a belt 39 and thence to another pulley 42 via another belt 41. The pulley 42 is constrained to joint rotation with a worm 43 coaxially coupled thereto. The drive cam 44 is peripherally toothed for engagement with the worm 43 and thus rotates therewith in a horizontal plane.

Figure 9A:
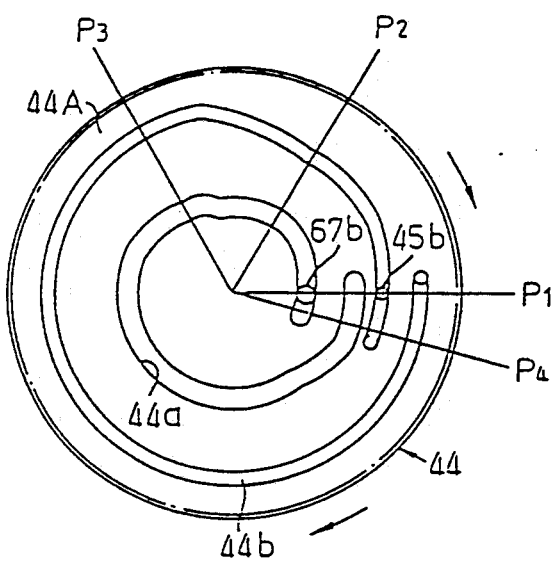
FIGS. 9A and 9B are plan views showing the opposite sides, respectively, of the drive cam.
Figure 9B:
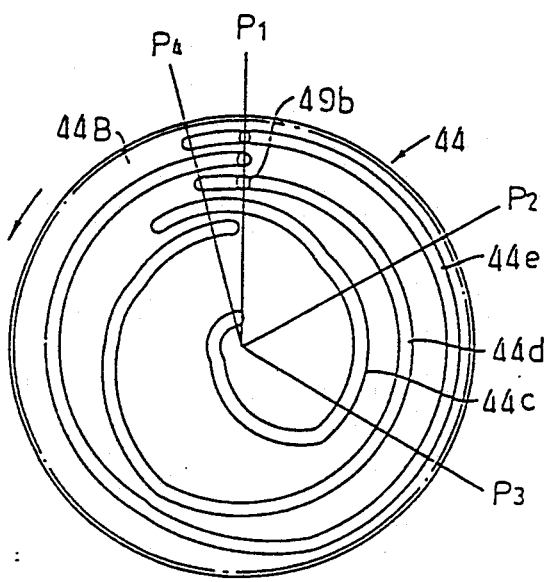

As pictorially represented in FIGS. 9A and 9B, the drive cam 44 has two cam grooves 44a and 44b formed in its top face 44A, and three cam grooves 44c, 44d and 44e in its bottom face 44B. The cam groove 44a is for driving the floating chassis 61 via the floating-chassis drive linkage 83. The cam groove 44b is for driving the guide arm 24 and half-loading arm 26 via the pole transfer mechanism 27. The cam groove 44d is for driving the pair of tape loader assemblies 10 and 11 via the tape loader drive linkage 9.

An inspection of FIGS. 6 and 7 will best indicate how the floating chassis 61 is supported for up-and-down displacement relative to the main chassis 4 and how it is driven from the drive cam 44 via the floating-chassis drive linkage 83.

Seen at 66 is a guide structure 66 secured to the main chassis 4. The guide structure 66 has defined therein four inverted-L-shaped guide slots, only two of which are seen at 66a and 66b in FIG. 7. Slidably engaged in these guide slots are as many pins 61a, 61b, 61c and 61d projecting laterally from the floating chassis 61, so that this chassis travels up and down as guided by the guide structure 66.

A cam follower lever 67 has one of its ends pivotally pinned at 4g to the main chassis 4. A cam follower pin 67b is planted on the cam follower lever 67 at its midpoint for relatively sliding engagement in the cam groove 44a, FIG. 9A, in the top face of the drive cam 44. Formed on the free end of the cam follower lever 67, an actuating pin 67a operatively engages the floating-chassis drive linkage 83, causing the same to move the floating chassis 61 up and down as the cam follower lever swings about its pivot pin 4g in response to the rotation of the drive cam 44.

The floating-chassis drive linkage 83 between the cam follower lever 67 and the floating chassis 61 comprises two elongate sliders 68 and 69 which are joined together under the force of a helical tension spring 70 for bidirectional, rectilinear displacement relative to the guide structure 66, in the directions indicated by the double-headed arrow designated $X_1$ and $X_2$. Another helical tension spring 73 acts on the slider 69 for biasing both sliders 68 and 69 in the $X_1$ direction.

FIG. 7 reveals a pair of racks 69a and 69b formed in one piece with the slider 69. The racks 69a and 69b are in mesh with pinions 71 and 72, respectively, rotatably mounted on the guide structure 66. The pinions 71 and 72 are integrally provided with bifurcated swing arms 71a and 72a operatively engaged with the pins 61a and 61b on the floating chassis 61. The pinion 71 is also in mesh with a gear 74a mounted fast on one end of a rotatable shaft 74, FIG. 6, which has another gear 74b firmly mounted on its other end. The gear 74b engages still another gear, not seen, having a bifurcated swing arm 76 operatively engaged with the pin 61c on the floating chassis 61.

Thus, with the linear travel of the slider 69 in the $X_2$ direction, the bifurcated swing arms 71a, 72a and 76 all rotate in a clockwise direction as seen in FIG. 7, thereby lifting the floating chassis 61 to the working position depicted in this figure. It is the cam follower lever 67, FIG. 6, that causes such up-and-down travel of the floating chassis 61 via the drive linkage 83. Before the loading of the compact-size tape cassette 3, the cam follower lever 67 has been held in such an angular position by the drive cam 44 that the sliders 68 and 69 has been held displaced in the $X_1$ direction under the bias of the tension spring 73.

The reference numeral 77 in FIGS. 6 and 7 generally designates a locking mechanism for locking the floating chassis 61 in its working position of FIG. 7. The locking mechanism 77 comprises a locking member 79 rotatably mounted to a lug 78 formed in one piece with the fixed guide structure 66, and a helical tension spring 80 urging the locking member 79 in a counterclockwise direction as viewed in FIG. 7. The locking member 79 carries a pin 79a on one of its opposite ends for engagement in a recess 68b formed in an extension 68a of the slider 68. A tongue 79b is formed on the other end of the locking member 79. This tongue 79b is to be acted upon by a member included in a cassette transfer mechanism which is not illustrated as it falls outside the scope of this invention.

The cassette transfer mechanism is coupled to a cassette cradle or tray, also not shown, in which the standard- or compact-size tape cassette is to be loaded interchangeably, for moving the loaded cassette between a predetermined eject position and a predetermined record/reproduce position. The record/reproduce position for the standard-size tape cassette 2 is lower than that for the compact-size tape cassette 3. This is because both types of tape cassettes make common use of one of the drive spindles 18.

Therefore, actuated by the cassette transfer mechanism, the tongue 79b causes the locking member 79 to turn clockwise, as viewed in FIG. 7, against the bias of the tension spring 80 only when the standard-size tape cassette 2 is carried to its record/reproduce position. Thereupon the pin 79a on the locking member 79 becomes disengaged from the recess 68b in the slider 68 thereby permitting the sliders 68 and 69 to travel in the $X_1$ direction under the force of the tension spring 73. The result is the descent of the floating chassis 61 without interfering with the standard-size tape cassette 2.

On the other hand, when the compact-size tape cassette 3 is carried to its own record/reproduce position slightly higher than that of the standard-size tape cassette 2, the tongue 79b on the locking member 79 remains unactuated. As the locking member 79 stays in the FIG. 7 position under the bias of the tension spring 80, the pin 79a thereon is engageable with the slider 68 for positively locking the floating chassis 61 in the raised position in the face of possible downward forces that may be exerted thereon.

With reference back to FIG. 1 the pole transfer mechanism 27 comprises a cam follower lever 45 disposed on the underside of the main chassis 4, a slide 46 bidirectionally driven by the cam follower lever 45 in the directions $X_1$ and $X_2$, and a sector gear 47. Pivoted at one end by a pin 4d on the main chassis 4, the cam follower lever 45 carries a pin 45a on its other end which is slidably engaged in an arcuate slot 46a in the slide 46. Also, at a midpoint of the cam follower lever 45, a cam follower pin 45b is erected for sliding engagement in the groove 44b, FIG. 9A, in the drive cam 44. It is thus seen that the pole transfer mechanism 27 is also driven by the drive cam 44.

The slide 46 has three rectilinear slots 46b–46d defined therein, in addition to the arcuate slot 46a. These additional slots 46b–26d slidably receive a pin 24a on the guide arm 24, a pin 26a on the half-loading arm 26, and a shaft 47a of the sector gear 47, respectively. Also, the slide 46 has a projection 46e for abutting engagement with a pin 47b on the sector gear 47, and another projection 46f for abutting engagement with a pin 26b, FIG. 8, on the half-loading arm 26.

The guide arm 24 has a set of gear teeth 24b formed on its base end for engagement with the teeth of the sector gear 47. A helical tension spring 48 biases the sector gear 47 in a clockwise direction, as viewed in FIG. 1, so that the pin 47b on the sector gear normally butts on the projection 46e of the slide 46.

Such being the construction of the pole transfer mechanism 27, the cam follower lever 45 swings about its pivot 4d with the rotation of the drive cam 44. The swinging motion of this cam follower lever 45 is translated into the linear motion of the slide 46, which in turn is translated into the swinging motion of the guide arm 24 and the half-loading arm 26.

Figure 10:
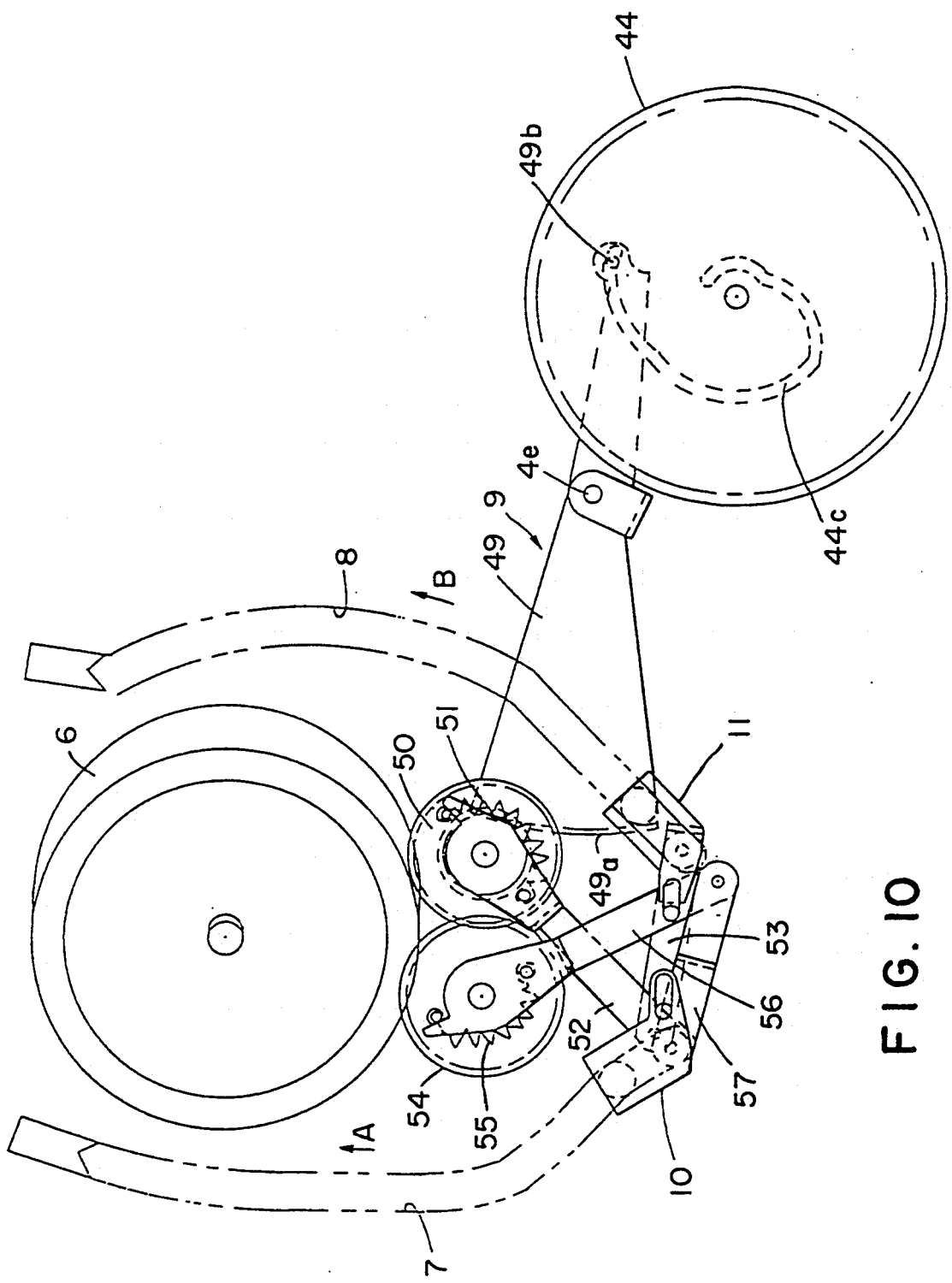
FIG. 10 is a top plan of the tape loader drive linkage in the apparatus of FIG. 1.

Although the tape loader drive linkage 9 is seen in FIG. 1, its configuration will be better understood by referring to FIG. 10 which shows only the tape loader drive linkage together with the rotary head assembly 6 and drive cam 44 for clarity. In FIG. 10, as in FIG. 1, the tape loader drive linkage 9 is shown in the state when the pair of tape loader assemblies 10 and 11 are in the second tape-unloading positions for the compact-size tape cassette 3.

The tape loader drive linkage 9 may be thought of as comprising a cam follower lever 49 medially pivoted at 4e on the underside of the main chassis 4. The cam follower lever 49 carries a cam follower pin 49b slidably engaged in a groove 44d, FIG. 9B, in the drive cam 44. The other end of the cam follower lever 49 is formed into a sector gear 49a in mesh with a loader drive gear 50. This gear is capable of joint rotation with a link 52 which is operatively coupled thereto via a helical tension spring 51, and the link 52 is operatively coupled to the tape loader assembly 11 via another link 53. Thus, upon clockwise rotation of the cam follower lever 49, the loader drive gear 50 rotates counterclockwise with the link 52. With such rotation of the link 52 the tape loader assembly 11 travels rearwardly along the guideway 8, as indicated by the arrow B.

The loader drive gear 50 also meshes with another loader drive gear 54, to which a link 56 is operatively coupled via a helical tension spring 55. The link 56 is operatively coupled to the other tape loader assembly 10 via another link 57. Therefore, with the counterclockwise rotation of the first loader drive gear 50, the second loader drive gear 54 rotates clockwise with the link 56. This clockwise rotation of the gear 54 is transmitted via the links 56 and 57 to the tape loader assembly 10, causing the latter to travel rearwardly along the guideway 7, as indicated by the arrow A.

As will be readily understood, the tape loader drive linkage 9 of the foregoing configuration can be of far less vertical dimension than the conventional stack of ring gears. The vertical dimension of the space required for the tape loader drive linkage 9 under the main chassis 4 is thus drastically reduced.

The horizontal position of the tape loader drive linkage 9 with respect to the floating chassis 61 is also important for the reduction of the vertical dimension of the compatible tape cassette apparatus 1. When the pair of tape loader assemblies 10 and 11 are in the second tape-unloading positions for the compact-size tape cassette 2, as represented in FIG. 1, the links 52, 53, 56 and 57 for the two tape loader assemblies cross each other and partly underlie the floating chassis 61. The floating chassis 61 is then raised to its working position for supporting the compact-size tape cassette 2. Since the tape loader drive linkage 9 is partly in the path of the up-and-down displacement of the floating chassis 61, the tape loader assemblies 10 and 11 must be moved to the second tape-unloading positions of FIG. 1 after the floating chassis has ascended to the working position. Also, the tape loader assemblies 10 and 11 must be moved away from the second tape-unloading positions before the floating chassis 61 descends to its retracted position.

Such timed travels of the tape loader assemblies 10 and 11 and the floating chassis 61 will become better understood from the following description of operation. The operational description will be better understood by referring to the timing diagram of FIG. 13, which indicates the various working positions of the tape loader assemblies 10 and 11 and the floating chassis 61 in timed relationship to each other.

In operation, the various movable parts of the recording/reproducing apparatus 1 are initialized in the positions of FIG. 1 when no tape cassette is loaded. The pair of tape loader assemblies 10 and 11 are in the second tape-unloading positions for the compact-size tape cassette 3. The floating chassis 61 is raised to the working position as in FIGS. 6 and 7.

Figure 11:
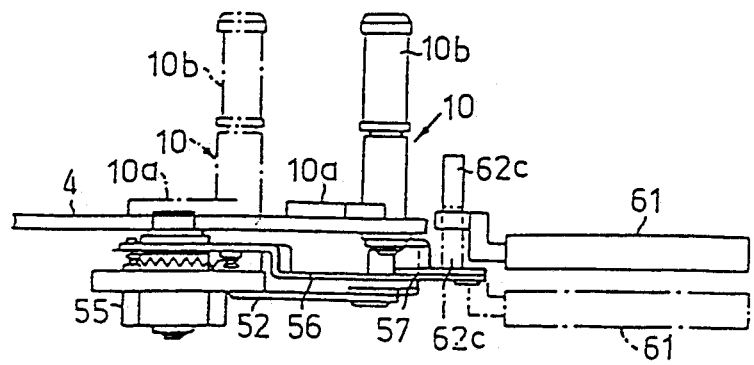
FIG. 11 is a somewhat diagrammatic elevation explanatory of how the tape loader drive linkage and the floating chassis move without interfering with each other.
Figure 12:
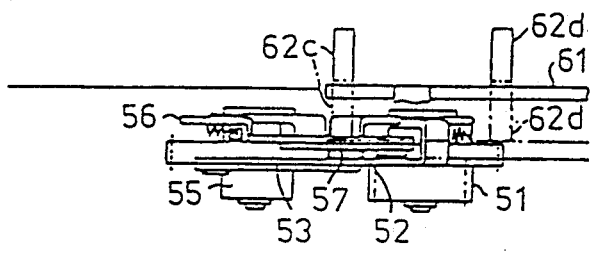
FIG. 12 is a right-hand side elevation of the showing of FIG. 11.

Let us first study the operation of the apparatus 1 when the standard-size tape cassette 2 is inserted therein. In response to the loading of the cassette 2, a cassette discriminator switch, not shown, sends to the electronic control circuitry of the apparatus a signal indicative of the fact that the loaded cassette is of the standard size. Method of determining the size of the cassettes i.e. either the compact-size or the standard-size applicable to the present invention, is disclosed in the European laid-open patent application No. 0311390 filed by the same applicant as of the present invention, therefore a detailed explanation of the determination is omitted in this specification. The floating chassis 61 must be retracted before the unshown cradle carrying the standard-size tape cassette 2 descends to its record-/reproduce position. However, as the tape loader assemblies 10 and 11 are now initialized as aforesaid in the second tape-unloading positions for the compact-size tape cassette 3, the links 52, 53, 56 and 57 of the tape loader drive linkage 9 partly underlie the floating chassis 61, as indicated by the solid lines in FIGS. 11 and 12. The tape loader assemblies 10 and 11 must therefore be moved away to the first tape-unloading positions of FIG. 8 for the standard-size tape cassette 2 before lowering the floating chassis 61 to the retracted position.

Therefore, as the unshown cassette discriminator switch detects the loading of the standard-size tape cassette 2, the unshown control circuitry actuates the drive motor 38 to cause rotation of the drive cam 44 in the arrow-marked direction in FIGS. 9A and 9B. As the drive cam 44 rotates approximately 60 degrees, the pin 45a, 49b and 67b on the cam follower levers 45, 49 and 67 relatively travel from position $P_1$ to position $P_2$ on the drive cam.

As the cam follower lever 49 of the tape loader drive linkage 9 thus rotates clockwise, the pair of tape loader assemblies 10 and 11 travel from their second tape-unloading positions of FIG. 1 to the first tape-unloading positions of FIG. 8. The travel of the tape loader assembly 10 in the direction A results in the counterclockwise rotation of the tension arm 13 under the bias of the tension spring 14.

Also, turning clockwise with the rotation of the drive cam 44, the cam follower lever 45 of the pole transfer mechanism 27 causes the slide 46 to travel in the $X_1$ direction. The projection 46e of the traveling slide 46 acts on the pin 47b on the sector gear 47, thereby causing the same to rotate counterclockwise. The other projection 46f of the slide 46 acts on the pin 26b, FIG. 8, on the half-loading arm 26. Thus the guide arm 24 and the half-loading arm 26 also swing from their FIG. 1 position to those of FIG. 8.

Figure 15:
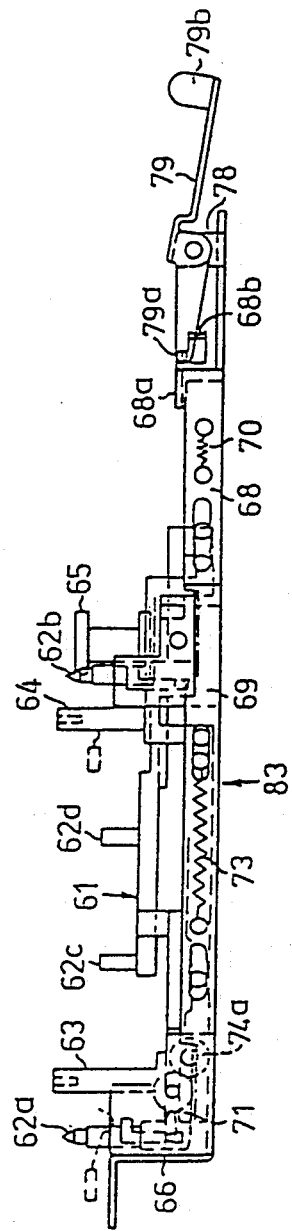
FIG. 15 is a view similar to FIG. 7 except that the floating chassis is shown in the retracted position.

Upon subsequent descent of the unshown cassette cradle, with the standard-size tape cassette 2 received therein, to the record/reproduce position, the tongue 79b on the locking member 79 is actuated. FIGS. 14 and 15 depict the locking member 79 so actuated with the consequent disengagement of the pin 79a thereon from the recess 68a in the slider 68. Since the cam follower lever 67 has already been turned counterclockwise by the drive cam 44, the sliders 68 and 69 of the floating-chassis drive linkage 83 have been out of engagement with the pin 67a. Consequently, when disengaged from the locking member 79, 35 the sliders 68 and 69 travel rectilinearly in the $X_1$ direction under the influence of the tension spring 73. Such linear travel of the sliders 68 and 69 results in the rotation of the bifurcated swing arms 71a, 72a and 76 in a counterclockwise direction, as viewed in FIG. 15. Thereupon the floating chassis 61 descends from its working position of FIG. 7 to the retracted position of FIG. 15.

Thus, as will be seen by referring back to FIGS. 11 and 12, the floating chassis 61 retracts to the broken-line position after the tape loader assemblies 10 and 11 retracts from the solid-line second tape-unloading positions to the broken-line first tape-unloading positions.

Lowered as above to the record/reproduce position, the standard-size tape cassette 2 comes to rest on the positioning pins 29 and 33a–33c on the main chassis 4. At the same time, as will be understood from FIG. 8, the guide poles 10b and 11b and slanting poles 10c and 11c of the tape loader assemblies 10 and 11, the tension pole 13a on the tension arm 13, the guide pole 23 on the guide arm 24, and the half-loading pole 25 on the half-loading arm 25 become all received in the recesses 2g and 2h, FIG. 3, in the standard-size tape cassette 2. The light source 35 on the carrier 36 is also received in the hole 2f in the standard-size tape cassette 2. Still further, the pair or drive spindles 18 become engaged in the pair of hub holes 2d and 2e in the standard-size tape cassette 2.

Thereafter, as the drive cam 44 further rotates in the arrow-marked direction of FIGS. 9A and 9B, the various movable parts of the apparatus 1 travel to the half-loading positions. Although the half-loading positions are not illustrated, it will be seen that the tape, partly pulled out from the loaded standard-size tape cassette 2, is fast-forward or rewound in this half-loaded state.

When the apparatus 1 is subsequently conditioned for the record/reproduce mode, the drive cam 44 further rotates, with the consequent relative displacement of the pin 49b on the cam follower lever 49 from position $P_3$ to position $P_4$ thereon. The cam follower lever 49 is thus turned further clockwise as viewed in FIGS. 1, 8 and 10. With this clockwise rotation of the cam follower lever 49, the link pair 52 and 53 and the other link pair 56 and 57 of the tape loader drive linkage 9 are both extended thereby moving the pair of tape loader assemblies 10 and 11 along the guideways 7 and 8 into abutment against the stops 5a and 5b. Taken out from the standard-size tape cassette 2, the magnetic tape is now loaded against the rotary head assembly 6. Also, with such travel of the tape loader assembly 10, the tension arm 13 is further turned counterclockwise until the tension pole 13a thereon becomes positioned between the full-width erase head 19 and the tape guide roller 22.

As is conventional in the art, the pinch roller arm 32 descends with the pinch roller 31 thereon with the travel of the tape loader assemblies 10 and 11 toward the stops 5a and 5b. Then the pinch roller arm 32 turns clockwise to thereby press the pinch roller 31 against the capstan 30 via the magnetic tape.

Now the apparatus 1 is ready for the commencement of recording or reproduction. Driven by one of the drive spindles 18, the magnetic tape travels past the full-width erase head 19, impedance roller 21, rotary head assembly 6, audio control head 81, capstan 30 and pinch roller 31, and guide pole 23.

The rotation of the drive motor 38 is reversed for ejecting the standard-size tape cassette 2 following a desired run of recording or reproduction. As the drive cam 44 is thus driven in the direction opposite to that indicated by the arrows in FIGS. 9A and 9B, the tape loader assemblies 10 and 11 and other movable parts of the apparatus come to a temporary stop in the first tape-unloading positions of FIG. 8. Then the cassette cradle carrying the standard-size tape cassette 2 is raised from the record/reproduce position to the eject position.

Then, as the drive cam 44 resumes rotation in the reverse direction, the pins 45a, 49b and 67b on the cam follower levers 45, 49 and 67 relatively travel from the position $P_2$ back to the position $P_1$ on the drive cam in FIGS. 9A and 9B. With the consequent swing of the cam follower lever 67 in a clockwise direction, as viewed in FIGS. 6 and 14, the pin 67a on its free end pushes the sliders 68 and 69 of the floating-chassis drive linkage 83 in the $X_2$ direction against the force of the tension spring 73. The floating chassis 61 therefore ascends from the retracted position of FIG. 15 back to the working position of FIG. 7.

Having been released from the unshown cassette transfer mechanism upon ascent of the cassette cradle to the eject position, the locking member 79 turns counterclockwise from its FIG. 15 to FIG. 7 position under the bias of the tension spring 80 upon ascent of the floating chassis 61 to the working position, thereupon which, the pin 79a on the locking member 79 becomes engaged in the recess 68b in the slider 68 thereby locking the floating chassis 61 in the working position. The initialization of the floating chassis 61 has now been completed.

Figure 13:
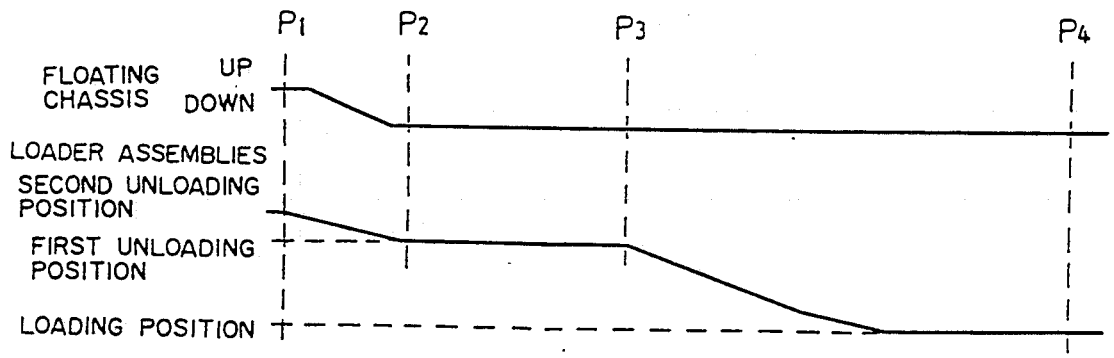
FIG. 13 is a timing diagram explanatory of how the floating chassis and the tape loader assemblies travel to the required positions in timed relationship to each other.

As will be noted by referring again to the timing diagram of FIG. 13, the initialization of the pair of tape loader assemblies 10 and 11 comes slightly after that of the floating chassis 61. The tape loader assemblies 10 and 11 return to the second tape-unloading positions, indicated by the solid lines in FIGS. 11 and 12, after the floating chassis has returned to the solid-line working position. It is thus possible to prevent the links 52, 53, 57 and 58 of the tape loader drive linkage 9 from interfering with the up-and-down movement of the floating chassis 61.

The operation of the apparatus 1 in response to the insertion of the compact-size tape cassette 3 is much simpler, because the various movable parts of the apparatus have all been initialized in the FIG. 1 positions for this type of cassette.

When the unshown cassette cradle carrying the compact-size tape cassette 3 descends to the record/reproduce position on the positioning pins 62a–62d on the floating chassis 61 being held in its working position as in FIG. 7, the guide poles 10b and 11b and slanting poles 10c and 11c of the tape loader assemblies 10 and 11, the tension pole 13a on the tension arm 13, the guide pole 23 on the guide arm 24, and the half-loading pole 25 on the half-loading arm 26 are all received in the recesses 3f, 3g and 3h, FIG. 4A, in the compact-size tape cassette 3. The light source 35 on the carrier arm 36 is also received in the recess 3h in the compact-size tape cassette 3. Also, upon descent of the compact-size tape cassette 3 to the record/reproduce position, the supply-side drive spindle 18 becomes engaged in the supply hub hole 3c in the cassette. Furthermore, the drive gear 65 on the floating chassis 61 becomes engaged with the driven gear 3d on the takeup hub of the cassette 3.

As has been stated, the record/reproduce position of the compact-size tape cassette 3 is somewhat higher than that of the standard-size tape cassette 2. Consequently, the locking member 79, FIGS. 6 and 7, of the floating-chassis locking mechanism 77 remains unactuated by the unshown cassette transfer mechanism upon descent of the compact-size tape cassette 3 to its record/reproduce position. The floating chassis 61 thus remains locked in its working position, positively supporting the cassette 3 thereon.

Thereafter the tape loader assemblies 10 and 11, guide arm 24, half-loading arm 26, etc., are all controllably driven by the drive cam 44 just as in the case of the standard-size tape cassette 2 set forth in the foregoing. It is therefore self-evident how the compact-size tape cassette 3 is subsequently put to recording or reproduction and how it is ejected.

Despite the foregoing detailed disclosure, it is not desired that the invention be limited by the exact details of the illustrated embodiment. A variety of modifications or alterations may be resorted to without departure from the fair meaning or proper scope of the following claims.

What is claimed is:

1. In a recording/reproducing apparatus for selective use with a relatively large-size tape cassette and a relatively small-size tape cassette which is smaller than the large-size tape cassette, in combination:

(a) a main chassis which lies substantially in a principal plane;

(b) first positioning means on the main chassis for positioning the large-size tape cassette thereon;

(c) a floating chassis mounted to the main chassis for displacement in a direction at right angles with the principal plane of the main chassis;

(d) second positioning means on the floating chassis for positioning the small-size tape cassette thereon;

(e) head means provided on the main chassis;

(f) tape loader means movably mounted to the main chassis for pulling out a tape from the large-size tape cassette positioned on the first positioning means, or from the small-size tape cassette positioned on the second positioning means, and for holding the tape against the head means;

(g) drive means;

(h) a floating-chassis drive linkage connecting the drive means to the floating chassis for moving the latter relative to the main chassis between a working position, where the floating chassis has the small-size tape cassette positioned on the second positioning means thereon, and a retracted position where the floating chassis is out of contact with the large-size tape cassette positioned on the first positioning means on the main chassis, the floating chassis being held in the working position; and (i) a tape loader drive linkage connecting the drive means to the tape loader means for moving the latter from a first tape-unloading position where the tape loader means engages the tape of the large-size tape cassette positioned on the first positioning means or second tape-unloading position where the tape loader means engages the tape of the small-size tape cassette positioned on the second positioning means to a tape-loading position where the tape loader means loads the tape, taken out from the large-or small-size tape cassette, against the head means, the tape loader drive linkage being partly in the path of the movement of the floating chassis between the working and the retracted positions only when holding the tape loader means in the second tape-unloading position, the tape loader means being held in the second tape-unloading position;

(j) the drive means driving the floating chassis and the tape loader means in timed relationship to each other for moving the floating chassis from the working to the retracted position after moving the tape loader means from the second to the first tape-unloading position when the large-size tape cassette is loaded in the apparatus, and for moving the floating chassis from the retracted to the working position before moving the tape loader means to the second tape-unloading position when the large-size tape cassette is unloaded from the apparatus.

2. The recording/reproducing apparatus of claim 1 wherein the tape loader means comprises a pair of tape loader assemblies movable along predefined paths on the main chassis, and wherein the tape loader drive linkage comprises:
 (a) a first pair of links each pivotally supported at one end for rotation in a plane parallel to the principal plane of the main chassis;
 (b) a second pair of links each operatively connecting another end of one of the first pair of links to one of the pair of tape loader assemblies; and
 (c) means for rotating the first pair of links in opposite directions by being driven by the drive means.

3. The recording/reproducing apparatus of claim 2 wherein the drive means comprises a drive cam, and wherein the jointly rotating means of the tape loader drive linkage comprises:
 (a) a cam follower driven by the drive cam for bidirectional rotation in a plane parallel to the principal plane of the main chassis;
 (b) a set of gear teeth formed on the cam follower;
 (c) a first gear meshing with the gear teeth of the cam follower and coaxially coupled to one of the first pair of links for joint rotation therewith; and
 (d) a second gear meshing with the first gear and coaxially coupled to the other of the first pair of links for joint rotation therewith.

4. The recording/reproducing apparatus of claim 1 wherein the drive means comprises a drive cam, and wherein the floating-chassis drive linkage comprises:
 (a) a cam follower driven by the drive cam for bidirectional rotation in a plane parallel to the principal plane of the main chassis;
 (b) slider means capable of linear reciprocation in a direction parallel to the principal plane of the main chassis, the slider means being acted upon by the cam follower for movement in a first direction relative to the main chassis;
 (c) resilient means biasing the slider means in a second direction opposite to the first direction; and
 (d) means for translating the linear reciprocation of the slider means into the movement of the floating chassis in the direction normal to the principal plane of the main chassis between the working and retracted positions.

5. The recording/reproducing apparatus of claim 4 further comprising a locking member capable of engagement with the slider means of the floating-chassis drive linkage for locking the same against movement in the second direction under the bias of the resilient means, and hence for positively locking the floating chassis in the working position, when the small-size tape cassette is positioned on the floating chassis.

* * * * *